(12) United States Patent
Dickerson et al.

(10) Patent No.: US 6,243,949 B1
(45) Date of Patent: Jun. 12, 2001

(54) COLD FORMING ALUMINUM METAL MATRIX ROTORS

(75) Inventors: Weston E. Dickerson, Milford, MI (US); Petar Jakovljevic, Mississauga (CA)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/058,614

(22) Filed: Apr. 10, 1998

(51) Int. Cl.$^7$ ...................................................... B23P 17/00
(52) U.S. Cl. ...................................... 29/894.323; 29/527.7; 188/218 XL
(58) Field of Search .................. 188/73.37, 218 L, 188/18 A; 29/527.5, 527.6, 527.7, 894.32, 894.323; 164/95, 94, 98

(56) References Cited

U.S. PATENT DOCUMENTS

| | | | |
|---|---|---|---|
| 5,183,632 | * | 2/1993 | Kiuchi et al. ........................... 419/48 |
| 5,353,553 | * | 10/1994 | Miller ...................................... 451/32 |
| 5,430,926 | * | 7/1995 | Hartford ................................. 29/434 |
| 5,503,214 | * | 4/1996 | Cribley et al. ........................ 164/134 |
| 5,509,510 | * | 4/1996 | Ihm ................................. 188/218 XL |
| 5,531,024 | * | 7/1996 | Lowe et al. ....................... 29/894.323 |
| 5,620,042 | * | 4/1997 | Ihm ......................................... 164/95 |
| 5,884,388 | * | 3/1999 | Patrick et al. ....................... 29/527.2 |

* cited by examiner

Primary Examiner—Robert J. Oberleitner
Assistant Examiner—Pamela J. Lipka
(74) Attorney, Agent, or Firm—Marshall & Melhorn, LLC

(57) ABSTRACT

This invention relates to an improved method for producing aluminum MMC rotors. The method comprises the steps of initially casting an aluminum MMC rotor casting having a central pilot aperture, cold forming the friction section, cold forming the mounting section, punching the central pilot aperture to remove excess aluminum MMC material, and then forming fastener apertures in the mounting section. In the step of cold forming the friction section a plurality of cylindrical rollers are pressed against each side of the friction section and the rollers are moved in a circumferential direction around the friction section to finish the friction section to the desired dimensions. In the step of cold forming the mounting section a plurality of cylindrical rollers are pressed against each side of the mounting section and the rollers are moved in a circumferential direction around the mounting section to finish the mounting section to the desired dimensions. The excess aluminum MMC material is removed at the radially inner edge of the mounting section by punching the central pilot aperture. Finally, fastener apertures are formed in the mounting section.

15 Claims, 4 Drawing Sheets

COLD FORMING ALUMINUM METAL MATRIX ROTORS

BACKGROUND OF THE INVENTION

The present invention relates to rotors for caliper disc brakes and the like, and in particular to cold forming aluminum metal matrix rotors.

Rotors are generally well known in the art, and are used extensively in vehicle braking systems, power transmission devices, clutches, and other similar machinery and mechanisms. Vehicle caliper disc braking systems slow the vehicle by inhibiting the rotation of the vehicle wheels. Rotors used in typical vehicle braking systems include a central hat section for attaching the rotor to a vehicle wheel and drive member for rotation therewith, and an outer friction portion having a pair of annular ring sections with opposed friction surfaces.

A caliper assembly secured to a non-rotating component of the vehicle, such as the vehicle frame. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted to the rest of the rotor and to other components to which the rotor is connected.

Brake rotors are typically cast from a ferrous material, such as cast or grey iron, and are then machined in multiple operations to shape the rotor, to form the inner hub portion and friction surfaces. However, ferrous metal rotors have some undesirable characteristics. Corrosion is a problem with ferrous metal brake rotors, particularly when they are used with spoked or windowed types of wheels in which rotors are normally visible. Some ferrous metal rotors are painted or otherwise surface treated to reduce corrosion but this adds cost to the part. Ferrous metal rotors are also typically heavy and add an undesirable amount of weight to the vehicle. Cast aluminum rotors are available to reduce the weight and corrosion problems associated with ferrous metal rotors, however, aluminum rotors do not possess adequate mechanical properties of high temperature strength, hardness and wear resistance.

It is known to make rotors using an aluminum based metal matrix composite (MMC) containing silicon carbide particulate reinforcement. Aluminum MMC rotors have sufficient mechanical and thermal properties at a significantly reduced weight compared to ferrous metal rotors. Typically, the rotor is cast from aluminum MMC and then machined in a conventional manner to form the finished rotor. However, the particulate reinforcement is very hard which makes the aluminum MMC castings difficult to machine compared to ferrous metal and conventional aluminum castings. Special, expensive cutting tools are needed to machine aluminum MMC, yet the tools still tend to wear excessively further increasing production costs. It is desirable to produce aluminum MMC rotors using a technique which will reduce production costs.

SUMMARY OF THE INVENTION

This invention relates to an improved method for producing aluminum MMC rotors. The method comprises the steps of initially casting an aluminum MMC rotor casting having a central pilot aperture, cold forming the friction section, cold forming the mounting section, punching the central pilot aperture to remove excess aluminum MMC material, and then forming fastener apertures in said mounting section.

In the step of cold forming the friction section a plurality of cylindrical rollers are pressed against each side of the friction section. The rollers are oriented such that the axes of the rollers form angles with the radius of the rotor. The rollers are then moved in a circumferential direction around the friction section such that the rollers move aluminum MMC material towards the radially outer edge of said friction section thereby finishing the friction section to the desired dimensions.

In the step of cold forming the mounting section a plurality of cylindrical rollers are pressed against each side of the mounting section. The rollers are oriented such that the axes of the rollers form angles with the radius of the rotor. The rollers are then moved in a circumferential direction around the mounting section such that the rollers move aluminum MMC material towards the radially inner edge of said mounting section thereby finishing the mounting section to the desired dimensions. The excess aluminum MMC material is removed at the radially inner edge of the mounting section by punching the central pilot aperture. Finally, fastener apertures are formed in the mounting section.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
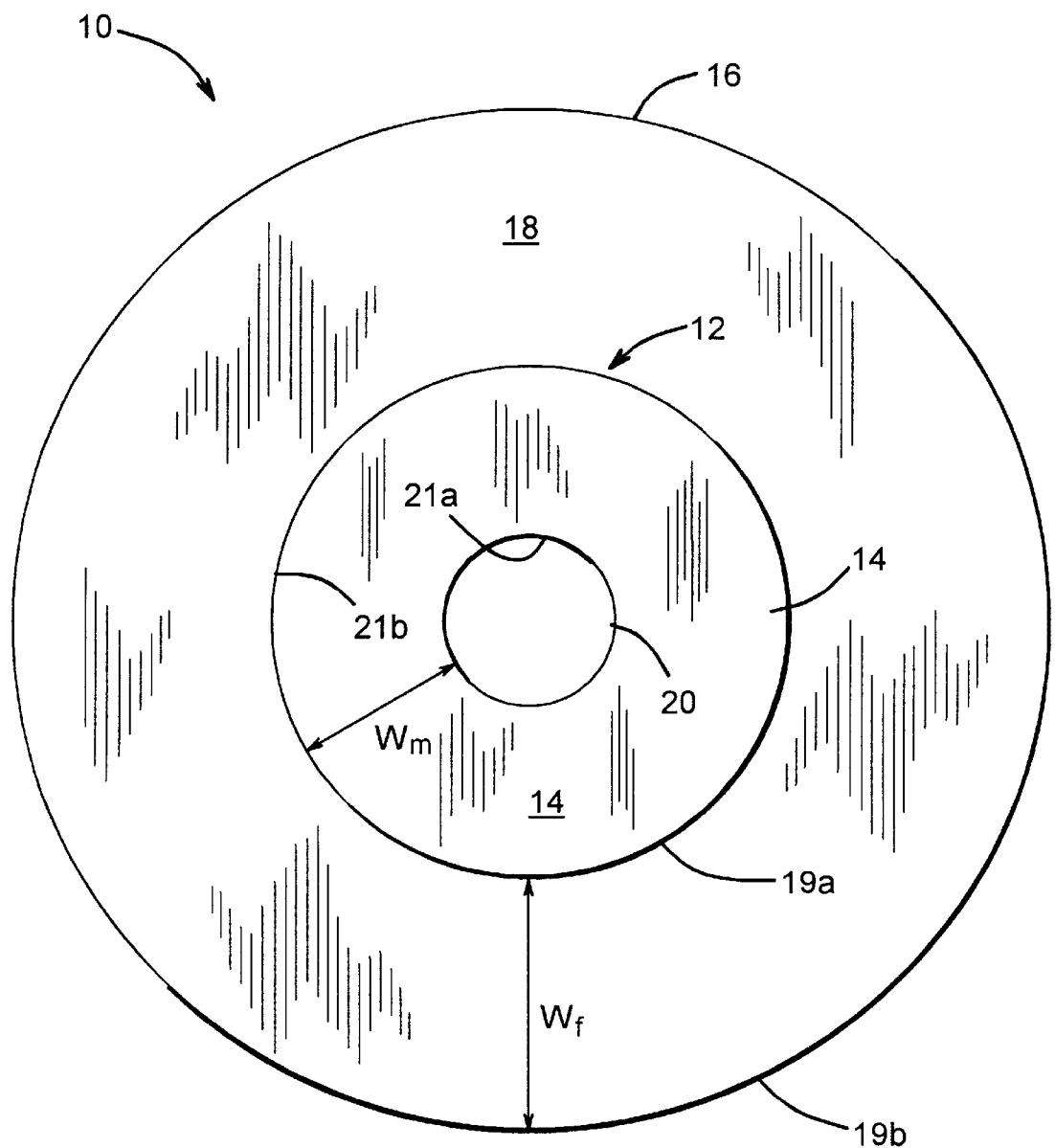
FIG. 1 is a plan view of a rotor casting cast in accordance with the present.
Figure 2:
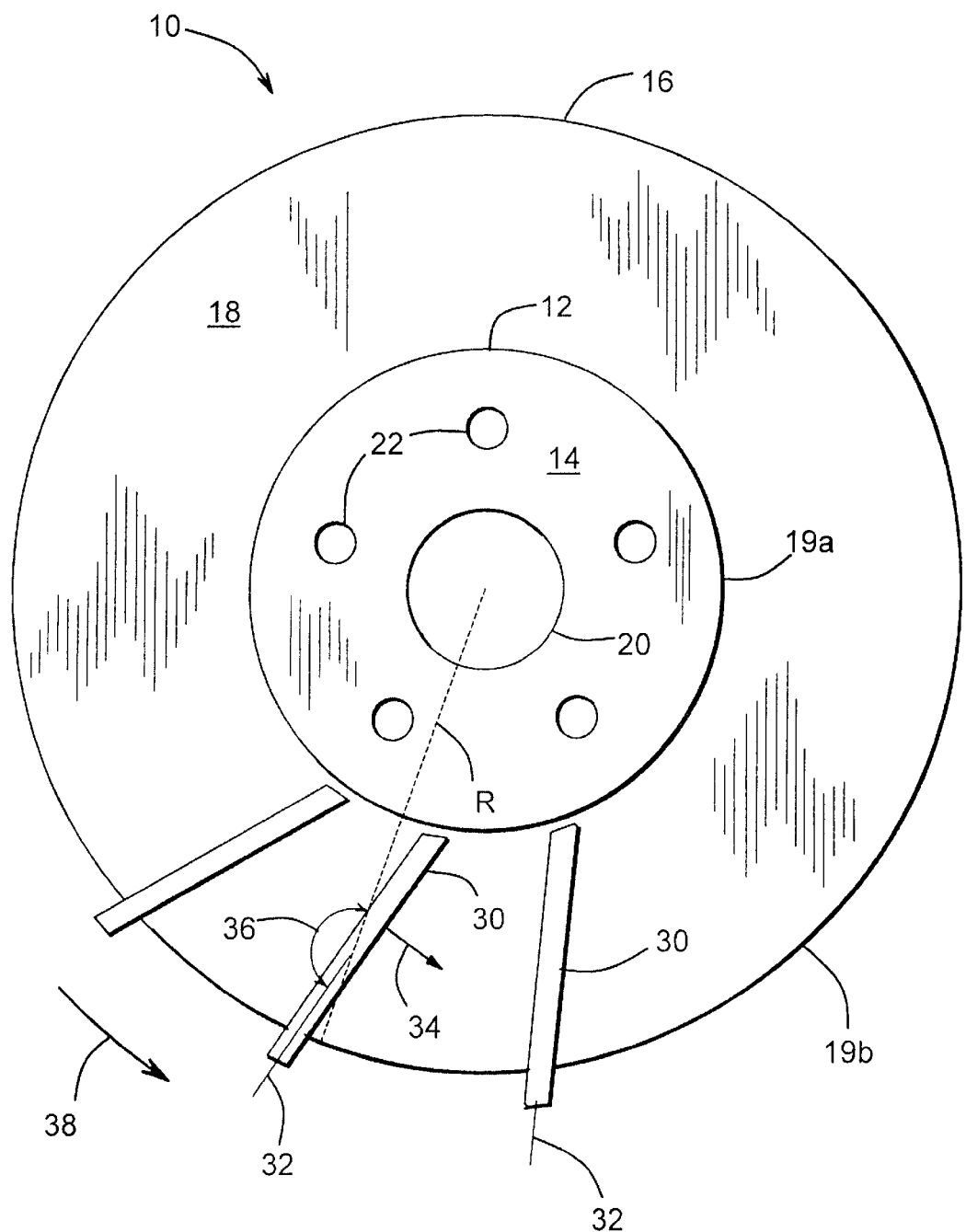
FIG. 2 is plan view of a rotor being cold formed in accordance with the present invention.

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an aluminum MMC rotor casting 10 is illustrated. The rotor casting 10 is formed by casting aluminum MMC in a conventional manner to produce the casting having physical dimensions which are close to the desired final dimensions. The rotor casting 10 is then cold formed to produce a finished rotor of the type adapted for use in conjunction with a variety of mechanical devices, such as caliper disc brakes and the like in a manner described below.

The rotor casting 10 includes a radially inner hub portion 12 having a central, generally circular mounting section 14 which mounts the same on an associated drive member (not shown), such as a spindle or vehicle axle. The rotor 10 also includes a radially outer annular friction section 16 having opposite friction surfaces 18 which interface with associated friction members (not shown), such as brake pads or the like. The annular friction section 16 of rotor 10 has a radially inner edge 19a and a radially outer edge 19b the radial distance between which comprises the radial width $W_f$ of the friction section.

The hub portion 12 has a generally hat-shaped side elevational configuration, wherein the central mounting section 14 is offset laterally from friction section 16 by a shoulder section (not shown). The central mounting section 14 of the inner hub portion 12 of rotor 10 has a central pilot aperture 20 cast therein, in which a spindle hub or the like is closely received. The central mounting section 14 of rotor 10 has a radially inner edge 21a adjacent or circumscribing the pilot aperture 20, and a radially outer edge 21b the radial distance between which comprises the radial width $W_m$ of the mounting section. In the illustrated example, the central mounting section 14 and outer friction section 16 are substantially flat, each having a generally uniform thickness.

Referring now to FIG. 2, the outer friction section 16 is cold formed according to the invention to produce a finished friction section having the desired smoothness and thickness. During the cold forming process, the rotor casting may still be warm, however its temperature is well below the melting temperature of the aluminum MMC. A pair of die (not shown) each having a plurality of cylindrical rollers 30 (a portion of which are shown in FIG. 2) is pressed against both sides of the friction section 16. The rollers 30 are similar to those typically used in cold roll forming, each having a length which is longer than the friction section radial width $W_f$. The rollers 30 are angled such that the axis 32 of each roller 30 forms an angle 36 with the radius R of the rotor such that the axes of the rollers are not parallel to the radius of the rotor. The rollers are angled such that a line 34 normal to the surface of the roller, that is, forming a 90 degree angle therewith, faces towards the radially outer edge 19b of the friction section 16. The rollers preferably extend from the radially inner edge 19a of the friction section 16 to the radially outer edge 19b, although the rollers may only extend part of the distance between the inner and outer edges 19a, 19b. Preferably, eight to sixteen rollers 30 are used on each side of the rotor, although any suitable number of rollers per side may be used.

The rotor casting 10 is preferably held stationary while the dies are rotated to move the rollers 30 in a circular or circumferential direction around the friction section 16 as they are pressed against the friction surfaces 18. Alternatively, the dies may be held stationary and the rotor may be turned. The rollers 30 are moved in the general direction of the normal line 34 so that rollers move a small amount of aluminum MMC material towards the outer edge 19b thereby smoothing the friction surfaces 18. The rollers 30 are moved around circumference of the friction section 16 in this manner until the friction section achieves the desired smoothness and thickness of the finished rotor. Only a small amount of aluminum MMC material is actually moved during this process because the rotor casting was cast have dimensions very close to the desired dimensions of the finished rotor. The material moved to the radially outer edge 19b of the friction section 16 does increase the diameter of the finished rotor as compared to the rotor casting. However, the change in diameter is small, and rotors typically do not have extremely close tolerance requirements on the diameter measurement. To accommodate for the change in diameter, the rotor casting 10 may be cast with a smaller diameter than the desired diameter of the finished rotor.

Figure 3:
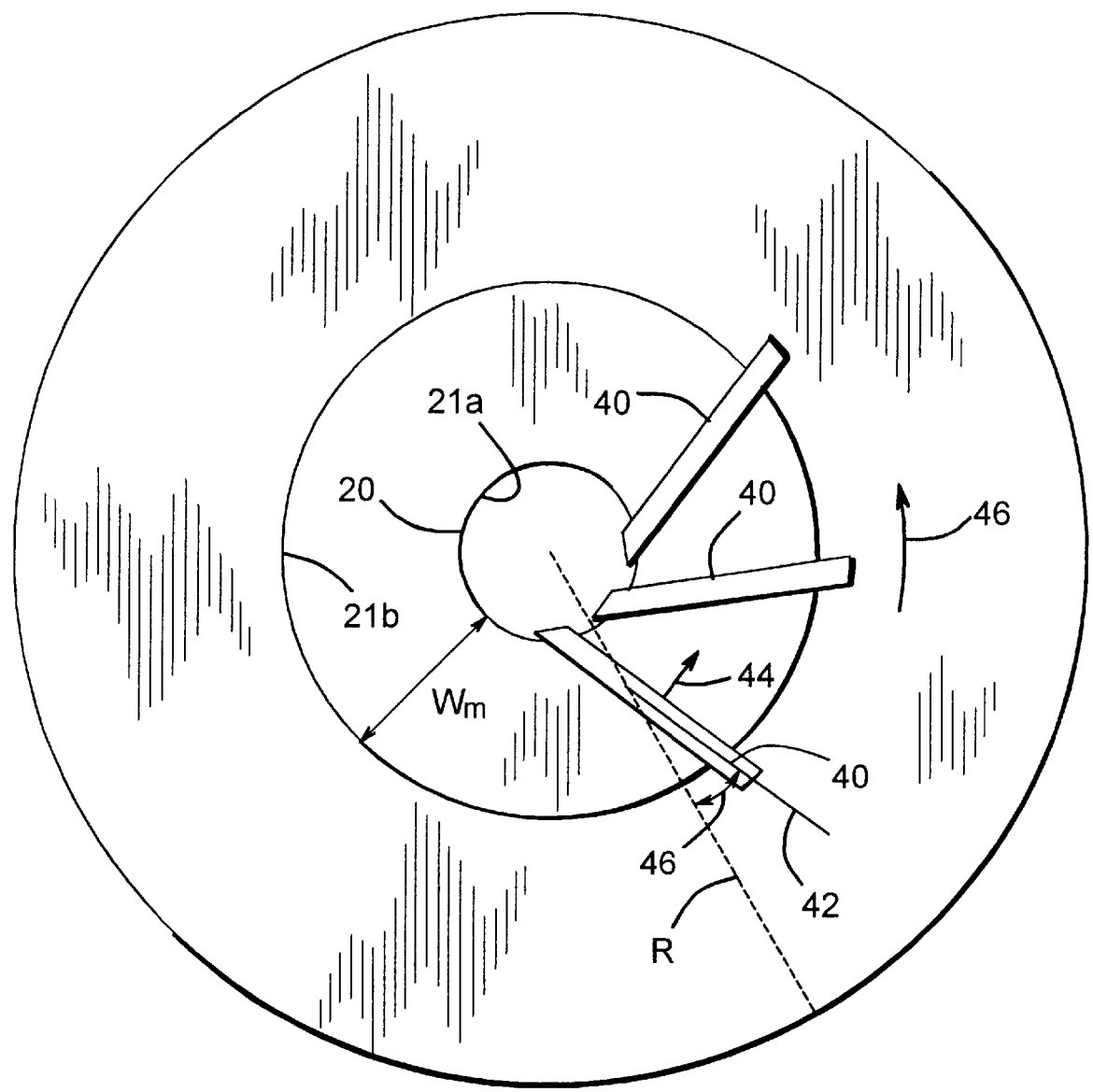
FIG. 3, is a plan view of a rotor being cold formed in accordance with the present invention.

Referring now to FIG. 3, the mounting section 14 is finished in a similar manner as the friction section 16. A pair of die (not shown) each having a plurality of cylindrical rollers 40 (a portion of which are shown in FIG. 3) is pressed against both sides of the mounting section 14. The rollers 40 are similar to those typically used in cold roll forming, each having a length which is longer than the friction section radial width $W_m$. The rollers preferably extend from the radially inner edge 21a of the mounting section 14 to the radially outer edge 21b, although the rollers may only extend part of the distance between the inner and outer edges 21a, 21b. The rollers 40 are angled such that the axis 42 of each roller 40 forms an angle 46 with the radius R of the rotor. The rollers are angled such that a line 44 normal to the surface of the roller, that is, forming a 90 degree angle therewith, faces towards the radially inner edge 21a of the mounting section 14. Preferably, eight to sixteen rollers 40 are used on each side of the rotor mounting section, although any suitable number of rollers per side may be used.

The rotor casting 10 is preferably held stationary while the dies are rotated to move the rollers 40 in a circular or circumferential direction around mounting section 14 as they are pressed against the mounting section 14. Alternatively, the dies may be held stationary and the rotor may be turned. The rollers 40 are moved in the general direction of the normal line 44 so that rollers move a small amount of aluminum MMC material towards the inner edge 21a thereby smoothing the mounting surface 14. The rollers 40 are moved around circumference of the mounting section 14 in this manner until the mounting section achieves the desired smoothness and thickness of the finished rotor. Only a small amount of aluminum MMC material is actually moved during this process because the rotor casting was cast have dimensions very close to the desired dimensions of the finished rotor. The friction section 16 and the mounting section 14 may both be cold formed simultaneously in the manner described above.

Figure 4:
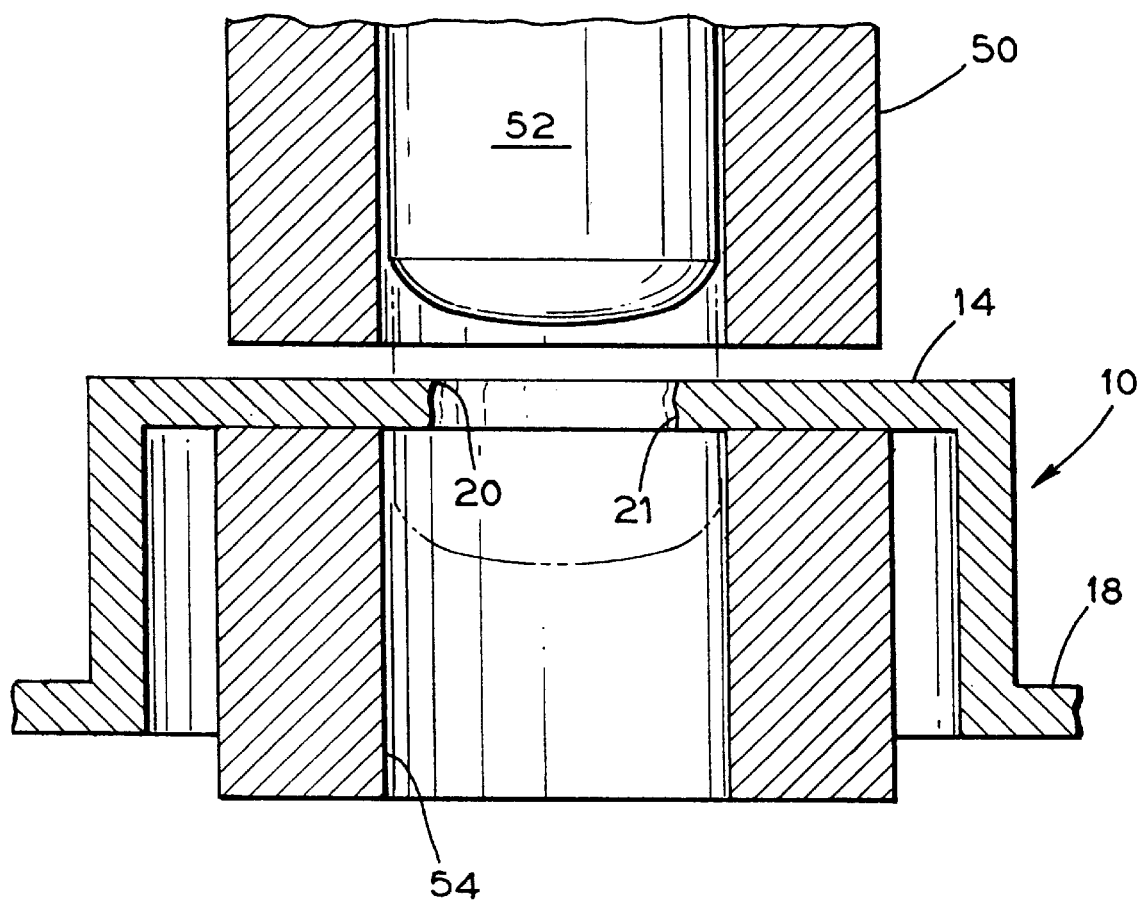
FIG. 4 is a sectional elevational view of a rotor being punched in accordance with the present invention.

Referring now to FIG. 4, the aluminum MMC material moved to the radially inner edge 21a of the mounting section 14 decreases the diameter of the central pilot aperture 20. The excess aluminum MMC material is removed, preferably using a conventional punch 50 to punch the central pilot aperture 20 to the desired diameter. However, any known method of removing the excess aluminum MMC material at the radially inner edge 21a of the mounting section 14 may be used. The punch includes a cylindrical tool 52 which is positioned over the central pilot aperture 20. The tool 52 is then pushed into the central pilot aperture 20 (as shown in phantom) while supports 54 are positioned beneath and around the central pilot aperture 20.

To finish the rotor, a plurality of circumferentially spaced apart fastener apertures 22 in which fasteners are received to mount the rotor 10 on an associated drive mechanism are drilled or punched into the mounting section 14. Alternatively, the fastener apertures 22 may be cast into the rotor casting. The final position of the fastener apertures will then be adjusted by cold forming the material adjacent the fastener apertures in a manner similar to that described above to achieve the desired position.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of forming a rotor comprising:

forming a rotor having a flat annular aluminum MMC friction section with a radially outer edge and a radial width $W_f$;

pressing at least one cylindrical roller having an axis against said friction section, said roller axis forming an angle with the radius of said rotor, and wherein said at least one cylindrical roller is longer than $W_f$; and moving one of said friction section and said at least one cylindrical roller in a circumferential direction to cold form the flat friction section to the desired dimensions thereby moving aluminum MMC material towards the radially outer edge of said friction section.

2. The method of forming a rotor defined in claim 1 wherein the step of pressing at least one roller against said friction section includes pressing a plurality of rollers against said friction section such that the axes of said rollers form angles with the radius of said rotor.

3. The method of forming a rotor defined in claim 1 wherein said friction section includes opposite friction surfaces and the step of pressing at least one roller against said friction section includes pressing at least one roller against both of said opposite friction surfaces of said friction section.

4. The method of forming a rotor defined in claim 1 wherein the step of forming the rotor includes forming the friction section with a smaller outer diameter than the desired diameter of the finished rotor.

5. The method of forming a rotor defined in claim 1 wherein said step of moving aluminum MMC material includes moving said at least one roller in a circumferential direction around said friction section.

6. The method of forming a rotor defined in claim 1 wherein said step of moving aluminum MMC material includes turning said rotor against said at least one roller.

7. The method of forming a rotor defined in claim 1 wherein said step of forming a rotor includes casting an aluminum MMC rotor casting.

8. A method of forming a rotor comprising:

forming a rotor including a flat aluminum MMC central mounting section having a central pilot aperture circumscribed by the radially inner edge of the mounting section and a radial width $W_m$;

pressing at least one cylindrical roller having an axis against said mounting section, said roller axis forming an angle with the radius of said rotor, and wherein said at least one cylindrical roller is longer than $W_m$; and moving one of said mounting section and said at least one cylindrical roller in a circumferential direction to cold form the flat mounting section to the desired dimensions thereby moving aluminum MMC material towards the radially inner edge of said mounting section.

9. The method of forming a rotor defined in claim 8 wherein the step of pressing at least one roller against said mounting section includes pressing a plurality of rollers against said mounting section such that the axes of said rollers form angles with the radius of said rotor.

10. The method of forming a rotor defined in claim 8 wherein said central pilot aperture is cast in said mounting section.

11. The method of forming a rotor defined in claim 8 further including the step of removing excess aluminum MMC material at the radially inner edge of the mounting section.

12. The method of forming a rotor defined in claim 11 wherein the step of removing excess aluminum MMC material includes punching said central pilot aperture.

13. The method of forming a rotor defined in claim 8 wherein said step of moving aluminum MMC material includes moving said at least one roller in a circumferential direction around said mounting section.

14. The method of forming a rotor defined in claim 8 wherein said step of moving aluminum MMC material includes turning said rotor against said at least one roller.

15. The method of forming a rotor defined in claim 8 wherein said step of forming a rotor includes casting an aluminum MMC rotor casting.

* * * * *